(12) United States Patent
Noltemeyer et al.

(10) Patent No.: US 11,959,802 B2
(45) Date of Patent: Apr. 16, 2024

(54) SPECTROMETER DEVICE AND METHOD FOR PRODUCING A SPECTROMETER DEVICE

(71) Applicant: Robert Bosch GmbH, Stuttgart (DE)

(72) Inventors: Ralf Noltemeyer, Herrenberg (DE); Martin Husnik, Stuttgart (DE); Eugen Baumgart, Bad Teinach-Zavelstein (DE); Marc Schmid, Weissach (DE); Reinhold Roedel, Reutlingen (DE); Benedikt Stein, Stuttgart (DE); Christoph Schelling, Stuttgart (DE); Christoph Daniel Kraemmer, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 151 days.

(21) Appl. No.: 17/413,198

(22) PCT Filed: Dec. 6, 2019

(86) PCT No.: PCT/EP2019/083923
§ 371 (c)(1),
(2) Date: Jun. 11, 2021

(87) PCT Pub. No.: WO2020/120296
PCT Pub. Date: Jun. 18, 2020

(65) Prior Publication Data
US 2022/0042847 A1 Feb. 10, 2022

(30) Foreign Application Priority Data
Dec. 12, 2018 (DE) .................... 10 2018 221 522.7

(51) Int. Cl.
*G01J 3/26* (2006.01)
*G01J 3/02* (2006.01)
(Continued)

(52) U.S. Cl.
CPC .............. *G01J 3/26* (2013.01); *G01J 3/0202* (2013.01); *G01J 3/0208* (2013.01);
(Continued)

(58) Field of Classification Search
CPC .......... G01J 3/26; G01J 3/0202; G01J 3/0208; G01J 3/2803; G01J 2003/1226; G01J 2003/2813
See application file for complete search history.

(56) References Cited

U.S. PATENT DOCUMENTS 5,225,888 A 7/1993 Selwyn et al.
11,035,726 B2 * 6/2021 Kasahara .................. G01J 3/26
(Continued)

FOREIGN PATENT DOCUMENTS

CN 102449451 A 5/2012
CN 107110636 A 8/2017
(Continued)

OTHER PUBLICATIONS

"A Guide to the Use and Calibration of Detector Array Equipment, Chapter 1: Detector Arrays", Hopkinson et al., 2004, SPIE Press Book, p. 1-3 (Year: 2004).*
(Continued)

*Primary Examiner* — Michelle M Iacoletti
*Assistant Examiner* — Kemaya Nguyen
(74) *Attorney, Agent, or Firm* — Maginot, Moore & Beck LLP

(57) ABSTRACT

A spectrometer device includes an optical interference filter which is designed to filter specific wavelength ranges of an incident light beam on passage through the optical interference filter. The spectrometer device also includes a detector device which is designed to detect the filtered light beam. Further, the spectrometer device includes a focusing device with a reflective surface. The focusing device is designed to (Continued)

focus the filtered light beam onto the detector device by reflection on the surface.

11 Claims, 3 Drawing Sheets

(51) Int. Cl.
*G01J 3/28* (2006.01)
*G01J 3/12* (2006.01)

(52) U.S. Cl.
CPC .......... *G01J 3/0256* (2013.01); *G01J 3/2803* (2013.01); *G01J 2003/1226* (2013.01); *G01J 2003/2813* (2013.01)

(56) References Cited

U.S. PATENT DOCUMENTS

| 2008/0030728 | A1 | 2/2008 | Nguyen | |
|---|---|---|---|---|
| 2009/0284742 | A1* | 11/2009 | Shibayama | G01J 3/02 356/328 |
| 2010/0302535 | A1* | 12/2010 | Lipson | G01J 3/4412 356/301 |
| 2015/0041631 | A1* | 2/2015 | Tkaczyk | F21V 33/0068 362/382 |
| 2016/0112776 | A1 | 4/2016 | Kim | |
| 2016/0123809 | A1* | 5/2016 | Learmonth | G01J 3/0208 356/454 |
| 2018/0011175 | A1* | 1/2018 | Faetani | G01S 17/02 |

FOREIGN PATENT DOCUMENTS

| DE | 196 81 285 T1 | 4/1998 | |
|---|---|---|---|
| DE | 10 2005 055 860 B3 | 5/2007 | |
| DE | 10 2016 220 290 A1 | 4/2018 | |
| DE | 10 2018 212 755 A1 | 2/2020 | |
| JP | 2017-219533 A | 12/2017 | |
| WO | WO-2007135244 A2 * | 11/2007 | ............... G01J 3/02 |
| WO | 2017/057372 A1 | 4/2017 | |

OTHER PUBLICATIONS

International Search Report corresponding to PCT Application No. PCT/EP2019/083923, dated Mar. 10, 2020 (German and English language document) (6 pages).

Ebermann, M. et al., "Aufbau und Betrieb eines Infrarot-Mikrospektrometers auf der Basis eines MEMS-FP-Filters," 2010, tm—Technisches Messen, vol. 77, No. 6 (8 pages).

* cited by examiner

SPECTROMETER DEVICE AND METHOD FOR PRODUCING A SPECTROMETER DEVICE

This application is a 35 U.S.C. § 371 National Stage Application of PCT/EP2019/083923, filed on Dec. 6, 2019, which claims the benefit of priority to Serial No. DE 10 2018 221 522.7, filed on Dec. 12, 2018 in Germany, the disclosures of which are incorporated herein by reference in their entirety.

The present disclosure relates to a spectrometer device and to a method for producing a spectrometer device. In particular, the present disclosure relates to a spectrometer device configured as a Fabry-Pérot interferometer.

BACKGROUND

Optical spectrometers are used for analyzing light beams by examining the spectrum. An auxiliary unit for infrared microspectrometers is known from DE 196 81 285 T1. In particular, it discloses an internal reflection element which reduces the need for control of the angle of the incident radiation by the optical configuration of the objective. DE 10 2005 055 860 B3 discloses a gas sensor arrangement having a concave mirror, which is formed by a reflective inner wall of the housing and ensures an increased luminous efficiency.

The spectral components of the light beam may be determined by means of interferometers and a detection instrument. The optical interference filters used in this case have transmission properties that are dependent on the angle of incidence. In particular, the central transmitted wavelength depends on the angle of incidence of the light beam. The greater the angle of incidence of the light beam relative to the normal is, the more the central transmitted wavelength is shifted. For a good resolution or full-width at half-maximum of the light transmitted through the spectral element, a restriction of the angle range that can be picked up by the detector is therefore necessary. A possible restriction of the angle range may be carried out with the aid of an aperture, as is known from WO 17057372 A1. As an alternative, it is possible to use lenses that image light beams with the same angle of incidence onto the same position in the focal plane. By suitable selection of the size of the detector, only light from a desired angle of incidence interval is detected. Such an arrangement is known from US 2016/0112776 A1.

SUMMARY

The disclosure provides a spectrometer device having the features set forth below and a method for producing a spectrometer device having the features also set forth below.

The respective dependent claims relate to preferred embodiments.

According to a first aspect, the disclosure accordingly relates to a spectrometer device having an optical interference filter, a detector instrument and a focusing instrument. The optical interference filter is configured to filter particular wavelength ranges of an incident light beam when it passes through the optical interference filter. The detector instrument is configured to detect the filtered light beam. The focusing instrument has a reflective surface and is configured to focus the filtered light beam onto the detector instrument by reflection on the surface.

According to a second aspect, the disclosure accordingly relates to a method for producing a spectrometer device. An optical interference filter, which is configured to filter particular wavelength ranges of an incident light beam when it passes through the optical interference filter, is provided. A detector instrument, which is configured to detect the filtered light beam, is furthermore provided. Lastly, a focusing instrument, which has a reflective surface, is provided. The focusing instrument, the detector instrument and the optical interference filter are arranged with respect to one another in such a way that the focusing instrument focuses the filtered light beam onto the detector instrument.

The spectrometer device according to the disclosure is distinguished in that it can be constructed very compactly, i.e. it can have a very small overall height. The reason for this is that it is possible to omit additional lens elements and the focusing of the filtered light beam is carried out by the reflective surface of the focusing instrument, which may be configured with a small overall height, or a small overall height with a large input aperture. Furthermore, it is possible to use an optical interference filter having a large input aperture with good angle of incidence limitation. Overall, a high light efficiency and a good signal-to-noise ratio of the spectrometer device can therefore be achieved. Because of the improved angle restriction, i.e. the limitation of the detected angle of incidence range, it is also possible to achieve a high resolution.

A further advantage of the use of a reflective surface over the use of a lens consists in the practically negligible chromatic aberration of reflective surfaces, for instance metal mirrors. It is therefore possible to ensure the restriction of the angle of incidence with high quality over a wide wavelength range. Furthermore, the absorption of reflective surfaces is much less than the absorption of lens elements, which may be significant in particular wavelength ranges depending on the lens material. As much light as possible can therefore be detected by the use of reflective surfaces.

Furthermore, the components of the spectrometer device that are used can be joined together with little alignment outlay, so that the production costs can be kept low.

Lastly, it is possible to use a small and economical detector instrument, without the luminous efficiency being reduced. Despite the high light efficiency, the costs can therefore be reduced at the same time.

In contrast to use of lenses, the spectrometer device according to the disclosure makes do with a smaller number of interfaces through which the light beam passes before it is picked up by the detector instrument. Reflection losses possibly occurring are therefore reduced.

According to one preferred refinement of the spectrometer device, the detector instrument is integrated into the optical interference filter on a light exit side of the optical interference filter, on which the light beam emerges after passing through the interference filter. The detector instrument may also be arranged directly on the optical interference filter. Lastly, the detector instrument may be arranged indirectly on the interference filter, in which case additional layers may for example be formed between the detector instrument and the interference filter.

According to one preferred refinement of the spectrometer device, the detector instrument overlaps at least partially with an axis extending through a center of the optical interference filter. The spectrometer device may for example have a circular or square cross section, and the detector instrument is arranged at a position along the axis through the center of the circular or square cross section. The detector instrument and the interference filter are constructed symmetrically, so that the focusing instrument may also be constructed symmetrically. The focusing instrument may for instance have the shape of a parabolic mirror, which is configured symmetrically with respect to the axis and focuses the light beams onto the detector instrument arranged along the axis.

According to one preferred refinement of the spectrometer device, the spectrometer device furthermore has a carrier instrument. The optical interference filter, the detector instrument and the focusing instrument are arranged directly or indirectly on the carrier instrument. In particular, the optical interference filter and the focusing instrument may be arranged directly on the carrier instrument. Furthermore, the electrical connections or wiring of the optical interference filter, of the detector instrument and of the focusing instrument may be arranged on the carrier instrument or at least partially integrated into it.

According to one preferred refinement of the spectrometer device, the detector instrument is arranged directly on the optical interference filter, i.e. fastened indirectly to the carrier instrument, on the light exit side of the optical interference filter.

According to one preferred refinement of the spectrometer device, the detector instrument is arranged next to the interference filter on the carrier instrument on the light exit side of the optical interference filter. In this way, shadowing by the detector instrument may be avoided.

According to one preferred refinement of the spectrometer device, the carrier instrument comprises at least one spacer element, which connects the focusing instrument to the optical interference filter and spaces the focusing instrument and the optical interference filter apart from one another. The at least one spacer element at least locally has a preferably broadband-absorbent coating. By the absorbent coating, possible transverse or back radiation is prevented and therefore the signal-to-noise ratio is improved.

According to one preferred refinement of the spectrometer device, a surface section, next to the detector instrument, of the optical interference filter and/or of the carrier instrument at least locally has a preferably broadband absorbent coating. As an alternative or in addition, a surface section of the detector instrument may have an absorbent coating. In particular, the detector instrument may have a typically centrally arranged active region which is configured for the detection, as well as an inactive edge region which encloses this region and which may fully or at least partially have the absorbent coating. The absorbent coating likewise serves to reduce transverse and back radiation. Furthermore, light beams that pass through the interference filter at a relatively large angle of incidence and are not focused by the focusing instrument onto the detector instrument, i.e. they lie outside the acquisition range of the spectrometer device, are absorbed by the absorbent coating. A narrow and well-defined angle of incidence range may therefore be acquired by the spectrometer device.

According to one preferred refinement of the spectrometer device, the detector instrument comprises a ring detector, segmented detector elements and/or detector elements arranged so as to form an array. In this way, it is possible to detect different angle intervals or different wavelength ranges. With the aid of detector elements arranged so as to form an array, valuable additional information relating to a sample, for instance the surface condition of the sample, may be determined.

According to one preferred refinement of the spectrometer device, the detector instrument comprises at least two stacked detector elements, the detector elements respectively being sensitive for different wavelength ranges. This may, in particular, mean detector elements which are sensitive for wavelength ranges that do not overlap. A partial overlap of the wavelength ranges is, however, likewise possible.

According to one preferred refinement of the spectrometer device, the optical interference filter is configured as a Fabry-Pérot interference filter.

According to one preferred refinement of the spectrometer device, the detector instrument comprises at least one photodiode, in particular an InGaAs photodiode, an Si photodiode, a Ge photodiode, an ExInGaAs photodiode or a quantum dot detector.

In all the figures, elements and devices which are the same or functionally equivalent are provided with the same references. The numbering of method steps is used for clarity and is not in general intended to imply a particular chronological order. In particular, a plurality of method steps may also be carried out simultaneously.

DETAILED DESCRIPTION

Figure 1:
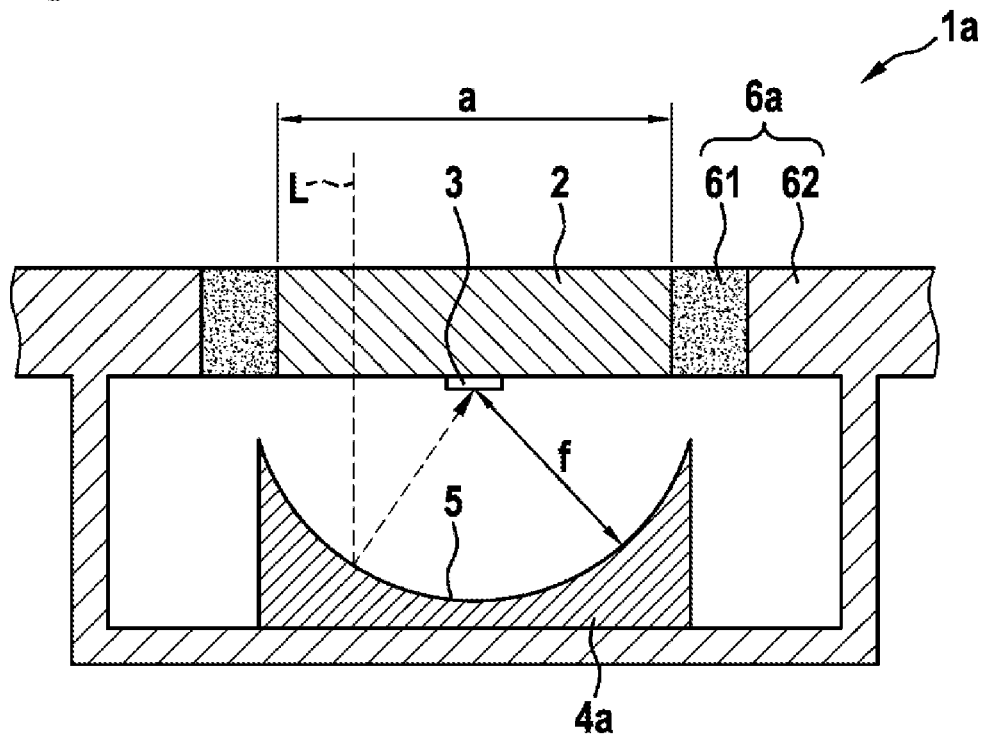
FIG. 1 shows a schematic cross-sectional view of a spectrometer device according to a first embodiment of the disclosure.

FIG. 1 shows a schematic cross-sectional view of a spectrometer device 1a, which has a carrier device 6a that in turn comprises a substrate 61, into which an optical interference filter 2 or spectral element is integrated. The carrier device 6a furthermore comprises holding elements 62, which hold a focusing instrument 4a.

The optical interference filter 2 is a preferably micromechanically produced Fabry-Pérot interference filter. The optical interference filter comprises two mirrors that are spaced apart relative to one another and can be actuated relative to one another. Depending on the angle of incidence of the light beams L on the optical interference filter 2, light beams L are transmitted with a slightly different central wavelength. The central wavelength furthermore depends on the distance of the two mirrors from one another. Preferably, the optical interference filter 2a has an encapsulation on one side or particularly preferably both sides. According to further embodiments, however, optical interference filters 2 with a different design and functionality are also possible.

On a light exit side of the optical interference filter 2, a detector instrument 3 is arranged in a central position. The detector instrument 3 is connected directly to the optical interference filter 2, for instance by an adhesive connection or a bond connection. The detector instrument 3 may, for example, be applied on a cap of the optical interference filter 2. The detector instrument 3 may comprise at least one photodiode as a detector element, which, as a function of the intensity of the incident light beams L, generates a photocurrent that can be measured and further evaluated. The spectrometer device 1a can deliver a measurement signal as a function of the photocurrent. According to further embodiments, the detector instrument 3 may comprise a multiplicity of detector elements, which are preferably sensitive at different wavelengths. It is furthermore possible to provide a ring detector which is arranged symmetrically around the middle of the input aperture of the optical interference filter 2, i.e. around an axis through the center of the optical interference filter 2. The detector instrument 3 may furthermore comprise at least one segmented detector element. By the use of ring detectors or segmented detector elements, a plurality of angle intervals and/or different wavelength ranges may be detected. In order to acquire different wavelength ranges, the detector instrument 3 may also comprise stacked detectors, i.e. dual detectors. The material of the detector elements of the detector instrument 3 may for example comprise silicon Si, indium gallium arsenide InGaAs, germanium Ge or lead selenide PbSe. Furthermore possible are detector materials based on quantum dots or dual detectors with InGaAs+Si material combinations. Besides individual detectors, the detector instrument 3 may also comprise array detectors. Furthermore, the detector instrument 3 may comprise additional imaging optics.

The focusing instrument 4a is configured as a parabolic mirror with a focal length f. The detector instrument is arranged in the middle of the input aperture of the optical interference filter 2, i.e. at the focal point of the symmetrically configured focusing instrument 4a, i.e. the focusing instrument 4a focuses light beams L that pass through the optical interference filter 2, and whose angle of incidence does not exceed a predetermined threshold value, onto the detector instrument 3. Light rays L with a higher angle of incidence are deflected into a region next to the detector instrument 3. A coating of an absorbent material, which absorbs the light beams L, is preferably arranged in this region next to the detector instrument 3 on the rear side, or light exit side, of the optical interference filter 2. The focusing instrument 4a may have a coating of a reflective material, in particular silver, gold or aluminum. At least one protective layer may additionally be provided. In particular, the focusing instrument 4a may be configured as a coated injection-molded part, or one on which vapor deposition has been carried out. According to further embodiments, the focusing instrument 4a may comprise lathed or milled parts, in particular made of aluminum. Instead of or in addition to reflective focusing mirrors, the focusing instrument 4a may also comprise further reflective optical components such as reflective, so-called metasurfaces.

The detectable angle of incidence interval is restricted and the resolution of the spectrometer device 1a is therefore adjusted, or optimized, as a function of the usable aperture a of the optical interference filter 2, or the usable diameter of the focusing instrument 4a, the focal length f of the focusing instrument and the size of the sensitive region of the detector instrument 3.

Figure 2:
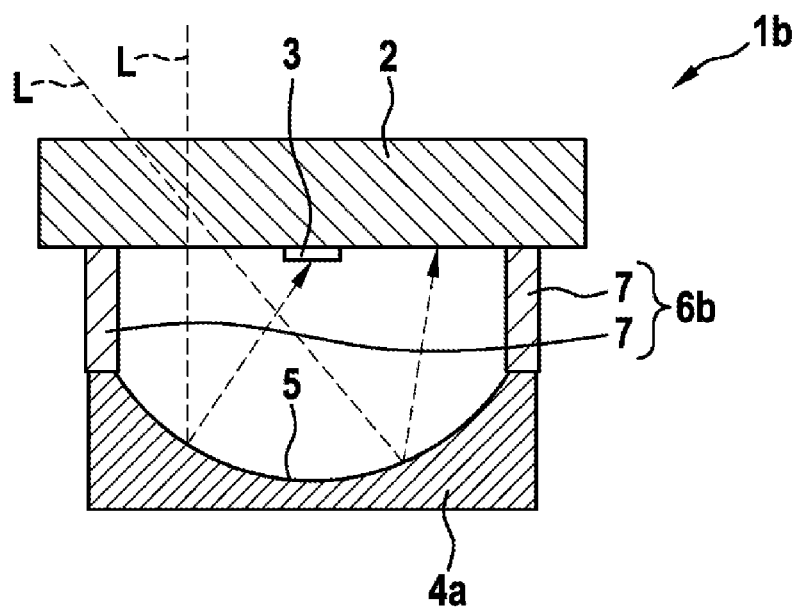
FIG. 2 shows a schematic cross-sectional view of a spectrometer device according to a second embodiment of the disclosure.

FIG. 2 shows a spectrometer device 1b which represents a variant of an above-described spectrometer device 1a and differs in the configuration of the carrier instrument 6b. Accordingly, the carrier instrument 6b comprises spacer elements 7, which connect the focusing instrument 4a to the optical interference filter 2 and space these elements apart from one another. The carrier instrument 6b may, in particular, be cylindrically configured. The spacer elements 7 preferably have an absorbent coating, which absorbs possible scattered light, on their inner side. The spacer elements 7 may be an additional layer, or a layer stack, or an element, for instance a wafer, connected by means of an adhesive connection or a bond connection. According to further embodiments, the focusing element 4a may be connected directly to the optical interference filter 2, for instance by means of an adhesive connection or a bond connection.

Figure 3:
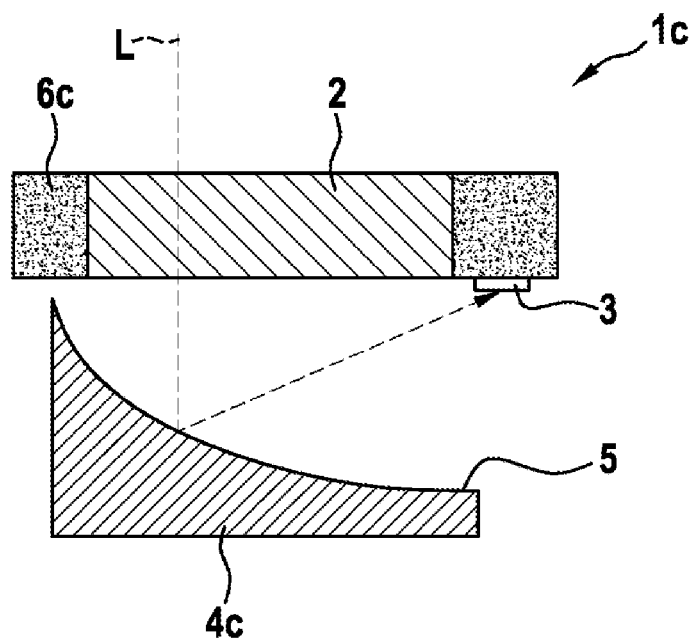
FIG. 3 shows a schematic cross-sectional view of a spectrometer device according to a third embodiment of the disclosure.

FIG. 3 shows a further spectrometer device 1c, which represents a variant of the above-described spectrometer devices 1a, 1b. The carrier instrument 6c may correspond to one of the carrier instruments 6a, 6b described above. In contrast to the spectrometer devices 1a, 1b depicted above, the focusing instrument 4c is configured asymmetrically, for example as a so-called off-axis reflector, i.e. the focal point of the focusing instrument 4c lies not at the center of the optical interference filter 2 but in a region outside the optical interference filter 2. Correspondingly, the detector instrument 3 is arranged on the carrier instrument 6c outside the optical interference filter 2 on a side facing toward the focusing instrument 4c, the focusing instrument 4c focusing the light beam L onto the detector instrument 3 after it passes through the optical interference filter 2. By the detector instrument 3 being arranged next to the optical interference filter 2, shadowing by the detector instrument 3 and by supply leads of the detector instrument 3 may be avoided, which may nevertheless be advantageous particularly in the case of relatively small input apertures despite the inferior ratio of input aperture a to focal length f due to the inferior light efficiency or the larger overall height as well as the increased reflection losses during the coupling of light into the detector instrument 3.

Figure 4:
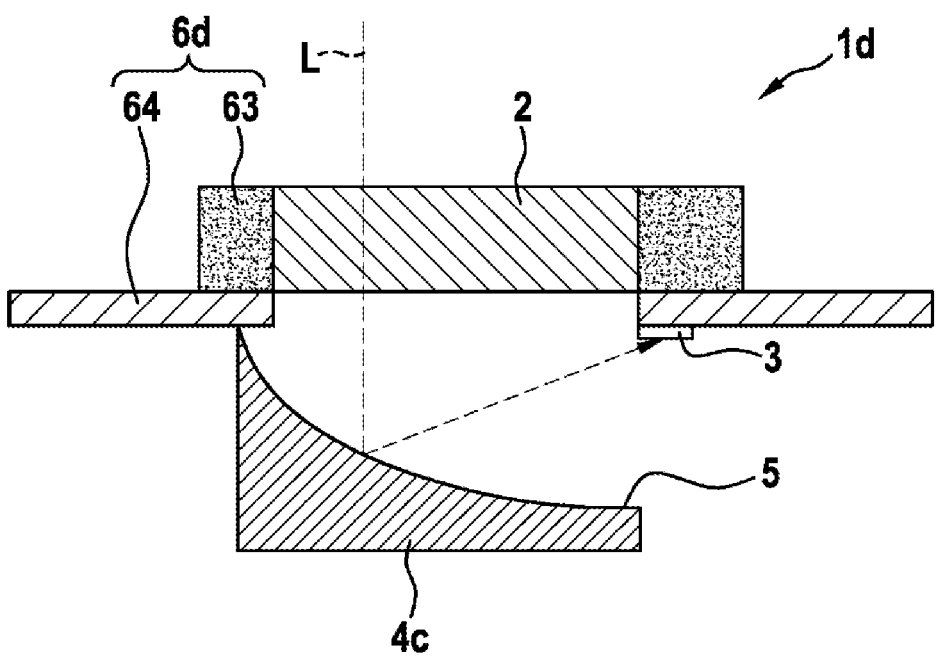
FIG. 4 shows a schematic cross-sectional view of a spectrometer device according to a fourth embodiment of the disclosure.

FIG. 4 shows a cross-sectional view of a further spectrometer device 1d, which is a variant of the spectrometer device 1c shown in FIG. 3. According to this embodiment, the carrier element 6d comprises a housing 63 of the optical interference filter 2 as well as a carrier plate 64, the detector instrument 3 being arranged on a side of the carrier plate 64 facing toward the symmetrical focusing instrument 4c.

Figure 5:
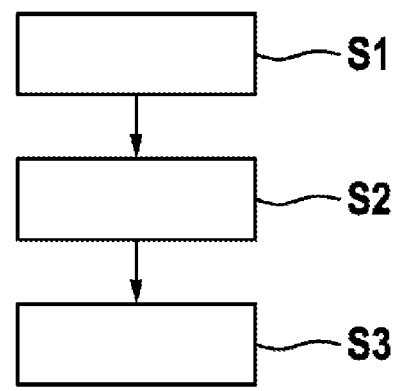
FIG. 5 shows a flowchart to explain a method for producing a spectrometer device according to one embodiment of the disclosure.

A flowchart of a method for producing a spectrometer device, in particular one of the spectrometer devices 1a, 1b, 1c, 1d described above, is illustrated in FIG. 5.

In a first step S1, an optical interference filter 2 is provided, in which case the optical interference filter 2 may in particular be an interference filter for a Fabry-Pérot interferometer. The optical interference filter 2 is configured in such a way that particular wavelength ranges of an incident light beam L are filtered when it passes through the optical interference filter 2.

In a further method step S2, a detector instrument 3, which is configured to detect the filtered light beam L, is provided. In particular, the optical interference filter 2 and the detector instrument 3 may be arranged on a common carrier instrument 6. The detector instrument 3 may also be arranged directly on the optical interference filter 2, optionally by means of additional intermediate layers.

In a method step S3, a focusing instrument 4a, 4c, which has a reflective surface 5, is provided. The focusing instrument 4a, 4c may be configured symmetrically or asymmetrically, the arrangement of the focusing instrument 4a, 4c, the detector instrument 3 and the optical interference filter 2 being carried out in such a way that a light beam L filtered by the optical interference filter 2 is focused onto the detector instrument 3 by means of the focusing instrument 4a, 4c.

The method steps S1, S2, S3 may be carried out in any desired order, and in particular even simultaneously.

The invention claimed is:

1. A spectrometer device, comprising:
an optical interference filter which is configured to filter particular wavelength ranges of an incident light beam when it passes through the optical interference filter;
a detector instrument which is configured to detect the filtered light beam;
a focusing instrument having a reflective surface, the focusing instrument configured to reflect the filtered light beam in a focused manner onto the detector instrument using the reflective surface, wherein the detector instrument is integrated into the optical interference filter, or arranged directly or indirectly on the interference filter, on a light exit side of the interference filter; and
at least one spacer element which connects the focusing instrument to the optical interference filter and spaces them apart from one another.

2. The spectrometer device as claimed in claim 1, wherein the detector instrument overlaps at least partially with an axis extending through a center of the optical interference filter.

3. The spectrometer device as claimed in claim 1, further comprising a carrier instrument wherein:
the optical interference filter, the detector instrument and the focusing instrument are arranged directly or indirectly on the carrier instrument.

4. The spectrometer device as claimed in claim 3, wherein the detector instrument is arranged next to the optical interference filter on the carrier instrument on the light exit side of the optical interference filter.

5. The spectrometer device as claimed in claim 3, wherein the carrier instrument comprises the at least one spacer element, the at least one spacer element at least locally having a light absorbent coating.

6. The spectrometer device as claimed in claim 3, wherein a surface section of the detector instrument and/or a surface section, next to the detector instrument, of the optical interference filter and/or of the carrier instrument at least locally has a light absorbent coating.

7. The spectrometer device as claimed in claim 1, wherein the detector instrument comprises a ring detector, segmented detector elements and/or detector elements arranged so as to form an array.

8. The spectrometer device as claimed in claim 1, wherein the detector instrument comprises at least two stacked detector elements, which are configured to detect different wavelength ranges.

9. The spectrometer device as claimed in claim 1, wherein the optical interference filter is configured as a Fabry-Pérot interference filter.

10. A method for producing a spectrometer device, with (i) an optical interference filter, which is configured to filter particular wavelength ranges of an incident light beam when it passes through the optical interference filter, (ii) a detector instrument, which is configured to detect the filtered light beam, and (iii) a focusing instrument having a reflective surface, comprising:
arranging the focusing instrument, the detector instrument and the optical interference filter with respect to one another, using at least one spacer element which connects the focusing instrument to the optical interference filter and spaces them apart from one another, in such a way that the reflective surface of the focusing instrument reflects the filtered light beam onto the detector instrument in a focused manner, and the detector instrument is integrated into the optical interference filter, or arranged directly or indirectly on the interference filter, on a light exit side of the interference filter.

11. A spectrometer device, comprising:
an optical interference filter which is configured to filter particular wavelength ranges of an incident light beam when it passes through the optical interference filter;
a detector instrument which is configured to detect the filtered light beam;
a focusing instrument having a reflective surface, the focusing instrument configured to reflect the filtered light beam in a focused manner onto the detector instrument using the reflective surface, wherein the optical interference filter is configured as a Fabry-Pérot interference filter; and
at least one spacer element which connects the focusing instrument to the optical interference filter and spaces them apart from one another.

* * * * *